(No Model.) 2 Sheets—Sheet 1.
R. BEYRLE.
FILTERING SYSTEM.
No. 487,467. Patented Dec. 6, 1892.
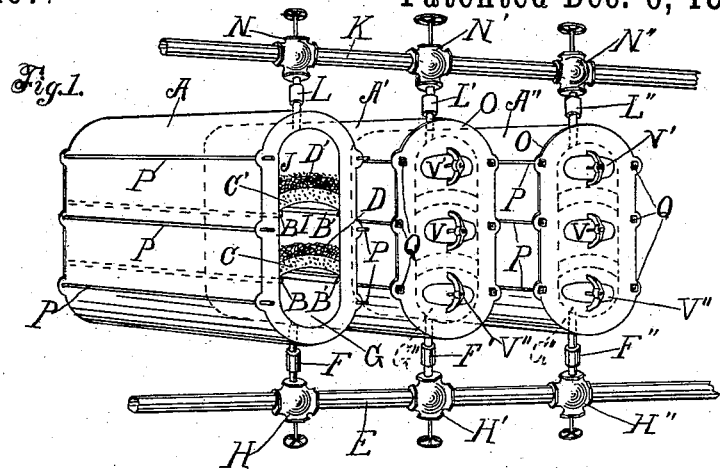
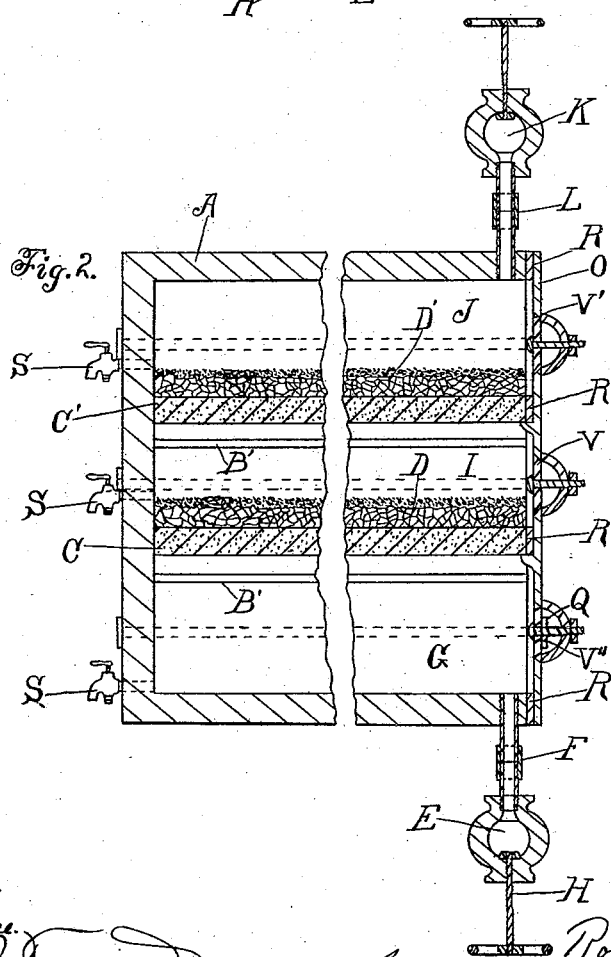
Witnesses.
M. M. Gee.
Alfred D. Townsend.
Inventor.
Robert Beyrle
J. Hazard Townsend
his atty
THE NORRIS PETERS CO., PHOTO-LITHO., WASHINGTON, D. C.

(No Model.) 2 Sheets—Sheet 2.
R. BEYRLE.
FILTERING SYSTEM.
No. 487,467. Patented Dec. 6, 1892.
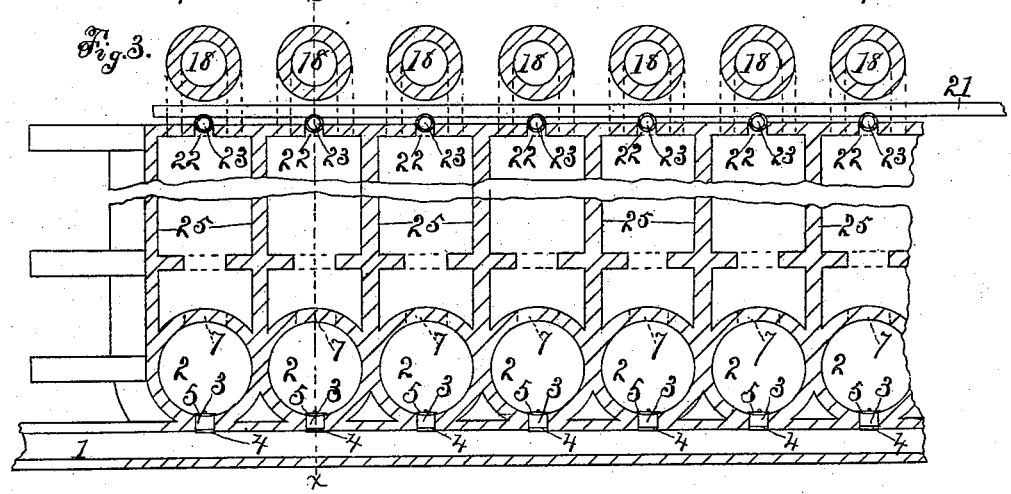
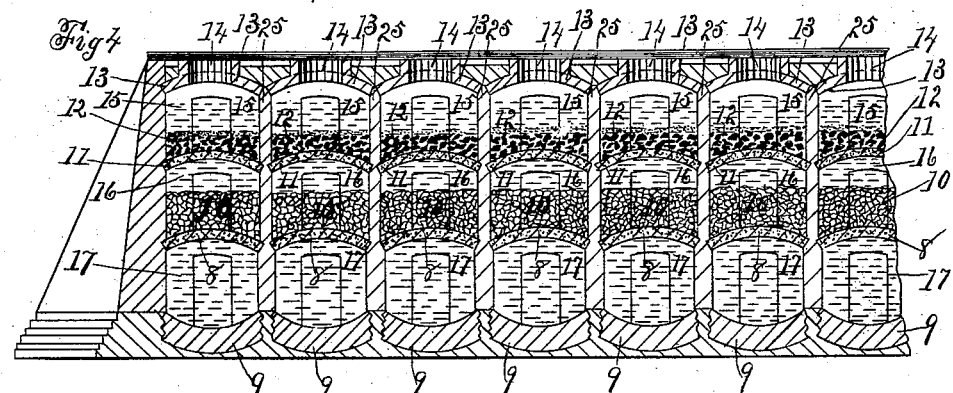
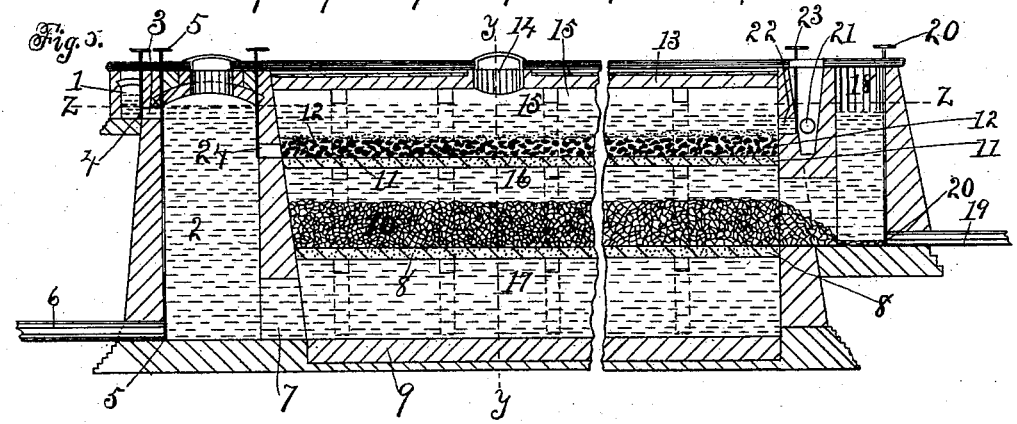

UNITED STATES PATENT OFFICE.

ROBERT BEYRLE, OF LOS ANGELES, CALIFORNIA.

FILTERING SYSTEM.

SPECIFICATION forming part of Letters Patent No. 487,467, dated December 6, 1892.

Application filed March 30, 1892. Serial No. 426,993. (No model.)

*To all whom it may concern:*

Be it known that I, ROBERT BEYRLE, a citizen of the United States, residing at Los Angeles, in the county of Los Angeles and State of California, have invented a new and useful Improvement in Filtering Systems, of which the following is a specification.

My invention relates more particularly to filters for large water-supplies, for city water-works, and like purposes; but it may be employed for household use and for use where a constant supply of filtered water is to be furnished.

The object of my invention is to provide means for the constant filtration of water delivered through a pipe whereby the system is adapted for ready and complete cleansing from time to time without interfering with such filtration, thus securing a constant supply of filtered water.

The filter embodying my invention as applied to the filtration of very large supplies of water—such as that for cities—differs somewhat from the filters for domestic use, and I have illustrated both forms in the accompanying drawings.

The first two views show the form for domestic use and the other three show a larger form.

Figure 1 is a view of a system or battery of filters comprising three members or filtering-tanks, the end plate or cap being removed from one of the tanks, as is done in cleansing the tank. Fig. 2 is a vertical longitudinal mid-section of one of the tanks. Fig. 3 is a plan view of the large filtering system in section on the line indicated by line $z\,z$, Fig. 5. Fig. 4 is a vertical section along the mid-line of such larger system and across the chambers at a line indicated by $y\,y$, Fig. 5. Fig. 5 is a vertical longitudinal mid-section of one of the reservoirs of the larger system. $x\,x$, Fig. 3, indicates the line of section.

I will first describe the filter designed for separate houses, the same being illustrated in Figs. 1 and 2. In these figures, A A' A'' are the several filter-tanks of my improved filter system. These tanks are closed and constructed to contain water under pressure and are preferably oblong in cross-section and have two parallel vertical sides and are respectively provided with horizontal partition-sustaining projections or ledges B B', arranged opposite each other to sustain the series of porous filter-partitions C C', upon which, dividing the respective tanks into a series of superimposed compartments, is placed the filtering material D D'.

E is a supply-conduit, a pressure-pipe communicating through suitable pipe connections F F', &c., with the lowest compartments G G', &c., of the several tanks.

H H', &c., are valves arranged, respectively, to close and open the several pipes or passages leading from the supply-conduit or pressure-pipe E into such lowest compartments G G' of the tanks, whence the water passes upward through the compartments I and J to the discharge-conduit or pure-water main K, communicating through suitable pipe connections L L', &c., with the several top compartments J of the tanks to receive the filtered water after it has passed upward through the tank.

N N', &c., are suitable valves arranged, respectively, to close the passages leading from the several tanks to the discharge-conduit or pure-water main.

The shells of the tanks A A', &c., may be made of earthenware, iron, or other suitable material, and the partitions C C' are formed, preferably, of porous terra-cotta and are arched in form. The cap-plates O are secured in their position on the end of the tank-shells by means of the rods P, passed through such plates and secured by nuts Q.

R is a suitable gasket placed between the shell and the plate.

In practice the water in the supply-main is under sufficient pressure to rise to the height of the discharge-main K.

All the members of the battery of filters may be in operation at once, if desired, and the water passing into the lower compartments of the tanks fills such compartments. The capacity of each compartment is much greater than the capacity of the supply-connection, and therefore the water in such compartment stands long enough to settle considerably before it rises to the lowest partition C, through which the water then filters as it rises. The filtration proceeds in the same manner as hereinafter described with relation to the form used for filtering water on a more extensive scale, passing upward through the layers of the filtering material, which rests upon the partitions and out through the connections L and valves N into the discharge-main K.

When it is desired to cleanse any one of the members of the battery, the valves controlling the connections with such member are closed, thus preventing the passage of the water into and out of such tank. The cocks S, which are provided to allow the water to be drawn out of the several compartments, are then opened to allow the water to flow out of the tanks. Then the cap-piece is removed from the shell, thus giving access to the interior of the tank and the sediment is removed. In case the filtering material is foul it also is removed and cleaned or replaced by new. Then the cap-piece is replaced and secured, and the supply and discharge valves are opened to allow the water to again pass through the tank and another tank is cleaned, if necessary, and so on until the whole is cleaned.

V V', &c., indicate hand-holes to allow access to each compartment.

The partitions C C' may be separate from or integral with the shell of the tank. In case they are integral with the tank, the supporting ledge or ledges B B' will be unnecessary.

I will now proceed to describe the system, as shown in Figs. 3, 4, and 5, designed for filtering large quantities of water. My invention as illustrated in those views consists of the combination of a supply-conduit, a series of non-communicating reservoirs, each comprising a receiving-well having an inlet at the top communicating with the supply-conduit and a chamber communicating at the bottom with the well and being divided by two or more horizontal pervious partitions into a series of superimposed compartments comprising the bottom receiving-compartment communicating with the receiving-well, one or more intermediate compartments, and the top purified-water compartment at the top provided with the service-outlet, all of such compartments except the lowest one being separated from the receiving-well and the said porous partitions being adapted to sustain layers of filtering material, layers of filtering material placed upon such porous partitions, a discharge-conduit connected with and leading from the upper compartments, means of ingress into the several compartments, valved blow-off pipes connected, respectively, with each of the compartments, and valves to control the flow of water into and out of the filter.

1 is the supply-conduit.

2 2 are the wells.

3 3 are the valved supply-passages leading from the supply-conduit into the wells.

4 4 are valves for controlling the flow of water into the wells 2 from conduit 1.

5 is the valve controlling the blow-off pipe 6 at the bottom of the wells.

7 7 are the passages between the wells and their respective chambers.

8 is a horizontal arched partition of porous terra-cotta or other suitable porous material at a suitable height from the base-floor 9 of the chamber.

It is desirable that the partition 8 be five or six feet above the base-floor 9 to give sufficient room for men to work in conveniently in removing sediment deposited upon the base-floor. Upon this porous terra-cotta partition is placed a layer 10 of gravel. At a suitable height above the partition 8 there is another porous terra-cotta partition 11, upon which is laid a layer of charcoal 12. The compartment above partition 11 is provided with a roof 13 at a suitable height above partition 11, and is provided with manhole 14 to give access to the top or purified-water compartments 15.

The several compartments 15 16 17 are each of such height that a man can conveniently work therein for the purpose of arranging and removing the filtering material and for removing the sediment.

18 is a manhole giving access to the intermediate or gravel compartment 16, and 19 is a blow-off pipe for the removal of water from compartment 16 when it is desired to enter it for any purpose.

20 is a valve controlling blow-off pipe 19.

21 is the discharge-pipe through which the water is drawn off for consumption. It is connected with compartment 15 by passage 22, which is controlled by valve 23.

24 is a valved blow-off pipe to draw off the the water from compartment 15.

The partition-walls 25 between the chambers of the filter are cemented and are impervious to water.

In practice the system comprises a greater number of reservoirs than are needed to filter the constant supply of water. A sufficient supply of water is turned into the several wells from the conduit 1 and the wells and the bottom compartments 17 are filled. The pressure of the water in the wells forces the water up through the porous terra-cotta partitions 8, the layers of gravel 10, the porous terra-cotta partitions 11, and the charcoal 12, which is weighted with a layer of sand, as usual in charcoal-filters to prevent floating. The valve 23 being open the filtered water flows into the discharge-pipe 21 ready for use. By this means the heavier sediment is deposited upon the floor of compartment 17 by precipitation, and as the water thus purified passes up through the reservoir the matter held more or less in solution adheres to the gravel or is absorbed by the charcoal.

By the arrangement of porous partitions shown I am enabled to keep separate the different kinds of filtering materials, which is a feature of great economic value, in that in some instances the character of the impurities in the water is such that the gravel will become foul before the charcoal, or vice versa, and in such case the foul filtering material can be removed without disturbing that which is comparatively pure.

When the filter becomes foul, its several chambers are cleaned in succession. Valve 4 and valve 23 of one member of the battery is closed and the valves 24, 20, and 5 are opened, thus allowing the water to flow from compartments 15, 16, and 17 and well 2. When the water has flowed out of the several compartments, laborers enter them and cleanse them, if necessary removing the fouled filtering material and replacing it with clean. The valves 24, 20, and 5 are then closed and valves 4 and 23 are opened and the operation is then performed upon another member of the system, and so on until all are cleansed.

If it is desired to cleanse the terra-cotta, the reservoir, after being cleaned and filled, is emptied through pipe 6, valve 4 being closed. The water thus flows by gravity downward through the porous partitions, thereby cleansing the pores.

Now, having described my invention, what I claim as new, and desire to secure by Letters Patent, is—

1. A filtering system comprising a series of filtering-tanks respectively provided with a series of porous filter-partitions and the superimposed compartments, the supply-conduit communicating through suitable connections with the lowest compartments of the several tanks, valves arranged, respectively, to close and open the several passages leading from the supply-conduit into such lowest compartment, the discharge-conduit communicating through suitable connections with the several top compartments, such connections and suitable valves arranged, respectively, to close the passages leading from the several tanks to the discharge-conduit.

2. A filtering system consisting of the combination of a supply-conduit, a series of non-communicating reservoirs, each comprising a receiving-well having an inlet at the top communicating with the supply-conduit, and a chamber, such chamber having an outlet at the top and communicating at the bottom with such well and divided by horizontal porous partitions into a series of superimposed compartments, all of which, except the lowest one, are separated from the receiving-well, layers of filtering material placed upon such porous partitions, a discharge-conduit connected with and leading from the upper compartments, means of ingress into the several compartments, valved blow-off pipes connected, respectively, with each of the compartments, and valves to control the flow of water into and out of the reservoirs.

ROBT. BEYRLE.

Witnesses:
JAMES R. TOWNSEND,
ALFRED I. TOWNSEND.